United States Patent
Fayyad et al.

(10) Patent No.: US 6,490,582 B1
(45) Date of Patent: Dec. 3, 2002

(54) ITERATIVE VALIDATION AND SAMPLING-BASED CLUSTERING USING ERROR-TOLERANT FREQUENT ITEM SETS

(75) Inventors: Usama M. Fayyad, Mercer Island, WA (US); Cheng Yang, Mountain View, CA (US); Paul S. Bradley, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/500,172

(22) Filed: Feb. 8, 2000

(51) Int. Cl.[7] ............................................. G06F 17/30

(52) U.S. Cl. ........................................................ 707/6

(58) Field of Search ......................................... 707/3, 6

(56) References Cited

U.S. PATENT DOCUMENTS

| | | | | |
|---|---|---|---|---|
| 5,301,257 A | * | 4/1994 | Tani ............................ | 382/156 |
| 5,551,020 A | * | 8/1996 | Flax et al. .................. | 707/101 |
| 5,845,285 A | * | 12/1998 | Klein .......................... | 706/15 |
| 5,999,566 A | * | 12/1999 | Lagarias et al. ............ | 375/224 |
| 6,012,058 A | * | 1/2000 | Fayyad et al. .............. | 707/2 |
| 6,021,220 A | * | 2/2000 | Anderholm .................. | 382/194 |
| 6,049,797 A | * | 4/2000 | Guha et al. .................. | 705/27 |
| 6,347,310 B1 | * | 2/2002 | Passera ........................ | 706/16 |

OTHER PUBLICATIONS

Jorng-Tzong Horng, Cheng-Yan Kao, and Gwo-Dong Chen, An Error-Toerance Genetic Algorithm for Traveling Salesman Problems, 1995, IEEE, pp. 795–799.*

David Burshtein, Typical Error Pattern Recovery of the Hopfield Memory under Error-Tolerant Conditions, 1998, IEEE, pp. 861–865.*

VenKatesh Ganti, Johannes Gehrke, and Raghu Ramakrishnan, A Framework for Measuring Changes in Data Characteristics, 1999, ACM, pp. 126–137.*

Tian Zhang, Raghu Ramakrishnan, and Miron Livny, BIRCH: A Efficient Data Clustering Method for very Large Databases, 1996 ACM, pp. 103–114.*

Cheng Yan, Usama Fayyad, and Paul S. Bradley, Effiecient Discovery of Error–Tolerant Frequent Itemsets in High Dimensions, 2001, ACM, pp. 194–203.*

Hannu Toivonen, Sampling Large Databases for Association Rules, Proceedings of the 22nd VLDB Conference Mumbai (Bombay), India, 1996, pp. 134–145.

(List continued on next page.)

Primary Examiner—John Breene
Assistant Examiner—Leslie Wong
(74) Attorney, Agent, or Firm—Watts, Hoffmann, Fisher & Heinke, Co., L.P.A.

(57) ABSTRACT

Iterative validation for efficiently determining error-tolerant frequent itemsets is disclosed. A description of the application of error-tolerant frequent itemsets to efficiently determining clusters as well as initializing clustering algorithms are also given. In one embodiment, a method determines a sample set of error-tolerant frequent itemsets (ETF's) within a uniform random sample of data within a database. This sample set of ETF's is independently validated, so that, for example, spurious ETF's and spurious dimensions within the ETF's can be removed. The validated sample set of ETF's, is added to the set of ETF's for the database. This process is repeated with additional uniform samples that are mutually exclusive from prior uniform samples, to continue building the database's set of ETF's, until no new sample sets can be found. The method is significantly more efficient than disk-based methods in the prior art, and the data clusters found are often not discovered by traditional clustering algorithm in the prior art.

31 Claims, 3 Drawing Sheets

OTHER PUBLICATIONS

Roberto J. Bayardo, Jr., Efficiently Mining Long Patterns from Databases, SIGMOD 98, Seattle, WA, USA, 1998, pp. 85–93.

Usama M. Fayyad, Cory Reina, P.S. Bradley, Initialization of Iterative Refinement Clustering Algorithms, Proceedings of the Fourth International Conference on Knowledge Discovery and Data Mining, AAAI Press, Aug. 1998.

Marina Meila, David Heckerman, An Experimental Comparison of Several Clustering and Initialization Methods, Microsoft Research Technical Report MSR–TR–98–06, Feb. 1998.

Dimitrios Gunopulos, Heikki Mannila, Sanjeev Saluja, Discovering all most specific sentences by randomized algorithms, *Proc. Of the $6^{th}$ Int'l Conf. On Database Theory*, pp. 215–229, 1997.

M.J. Zaki, S. Parthasarathy, M. Ogihara, W. Li, New algorithms for fast discovery of association rules, In *Proc. of the Third Int'l Conf. On Knowledge Discovery in Databases and Data Mining*, pp. 283–286, 1997.

\* cited by examiner

ITERATIVE VALIDATION AND SAMPLING-BASED CLUSTERING USING ERROR-TOLERANT FREQUENT ITEM SETS

FIELD OF THE INVENTION

This invention relates generally to the clustering of very large data sets, such as transactional, categorical, and binary data, and more particularly to such clustering using an iterative validation with selective iterative sampling approach based on error-tolerant frequent itemsets.

BACKGROUND OF THE INVENTION

With the advent of the Internet, and especially electronic commerce ("e-commerce") over the Internet, the use of data analysis tools, such as data mining, has increased. In e-commerce and other Internet and non-Internet applications, databases are generated and maintained that have large amounts of information, so that they can be analyzed, or "mined," to learn additional information regarding customers, users, products, etc. That is, data mining tools provide for leveraging the data already contained in databases to learn new insights regarding the data by uncovering patterns, relationships, or correlations that might help a business provide improved services, target product offerings, customize web sites, or understand how people use its web site.

A common data analysis operation is data clustering, which is also known within the art as database segmentation or data segmentation. Clustering targets identifying groups of records such that members of each cluster are more similar to records within the cluster than they are to records belonging to other clusters. Clustering is about determining groups of customers (or transactions, or baskets) as opposed to frequent item sets which determines groups of items within the data. Frequent items sets are sets of items (combinations of attributes of entities or records) that occur with significant frequency in the data. Finding clusters, such as groups of users, groups of purchasers, etc., instead of focusing on just the items themselves (products or web pages), allows for new insights to be obtained from the data. For example, a purchaser who has purchased items X and Y may also be predicted as likely to purchase item Z, based on other purchasers who have purchased items X and Y also having had purchased item Z. Thus, a retailer knowing this information may be compelled directly advertise item Z to this purchaser, or perhaps make a special offer or customized coupon for it, or even discount one of the items and hope to make margin on the other correlated items in the cluster.

Many clustering approaches, such as the Expectation Maximization (EM) approach or the K-means clustering algorithm, are known within the art. However, they typically operate on all the data within the database at a given time and require an initial specification of the fall clustering model.

Once this model is specified, the approaches iteratively refine the initial model to maximize the fit of the clustering model with the data. A drawback to such approaches, however, is that the function measuring the fit of the clustering model to the data has many local solutions. The clustering approach can only guarantee convergence to a local solution, and not a globally optimal solution. Hence, many other better solutions may be missed simply because the initial model was not good enough.

Usually the number of local solutions is very large when fitting databases of even modest size to a model. Many of the local solutions are often unsatisfactory. For example, when clustering high-dimensional sparse databases—that is, databases where each record (e.g. customer) only specifies values for a very small subset of all possible attributes or items (e.g. products). For example, of 100,000 products available in the store, each customer (record) usually purchases only 5 or 6 items. Another example is web browsing: out of millions of possible pages on the web, a typical user only visits a tiny fraction of them.—In such a situation, there may exist many local clustering solutions that have empty clusters, which are clusters containing no records of data. Another property that makes the clustering problem difficult is a skewed distribution over the items (attributes): a predetermined item dominates most items of the databases, such that variance therefrom is infrequent. When the frequency of items drops off geometrically, e.g. frequency of item i is proportional to $1/i$, the data is said to obey a Zipf distribution. The Zipf distribution is a skewed distribution and is observed in web-browsing data, product-purchasing data, and text-data.

Given the above difficulties, a common approach to the problem of determining an initial clustering within the prior art is to search for good clustering solutions by re-running the clustering approach from many different random initial cluster models, in the hope of finding a good solution. However, there are no guarantees, nor probabilistic arguments, that a good clustering solution will be found without employing methods exponential in running time. Even re-running the clustering approach from many different initial cluster models is computationally prohibitive for large-scale databases. For example, given a database of even modest size, the time required for running a clustering approach from a single initial clustering model can take hours or even days. Applying the approach from many different randomly selected initial clustering models can thus take many days. And again, there is no guarantee that a good solution will be found.

In addition the problem of clustering large databases is compounded since, even with a good initial cluster model, typical prior art clustering algorithms assume that the data set resides in main memory (each record can be accessed as many times as needed). Since the data of large databases cannot all usually fit into the memory of a computer at one time, constant disk accesses, as manifested by repeated scans or paging of memory to disk, known in the art as "thrashing," results, causing lengthy processing times to complete the clustering. For example, given a database of even modest size, the time required for running a clustering approach can take hours or even days. For this and other reasons, therefore, there is a need for the present invention: to efficiently determine cluster models by using Error Tolerant Frequent Itemsets over large databases using an iterative validation procedure. These models may be used as the final clustering solution or used to provide "good" initial clustering models to a prior art clustering algorithm.

SUMMARY OF THE INVENTION

The invention relates to iterative validation clustering using error-tolerant frequent itemsets (denoted as ETF's). In one embodiment, a method first determines a sample set of ETF's within a uniform sample of data within a database. This sample set of ETF's is validated, which in one embodiment includes testing the sample set of ETF's against a validation random sample, so that, for example, spurious ETF's and spurious dimensions (attributes) within the ETF's are removed. The sample set of ETF's, as validated, is then added to the set of ETF's for the database, which is initially set to empty. This process is repeated with additional uniform samples that are mutually exclusive from data satisfying the existing set of ETF's, to continue making new additions the set of ETF's for the database, until no additional sample sets can be found.

Embodiments of the invention provide for advantages not found within the prior art. For example, in one embodiment, the uniform sample of data is taken such that it can fit in the memory of the computer on which the method is implemented. For large databases especially, this greatly reduces the amount of time necessary to cluster the data, since computations at any one time are performed only on a sample of data, and thus are performed totally within memory. The multiple iterative samples over mutually exclusive data sets results in allowing the algorithm to get a complete view of the data without ever having to load the entire data set at once. In addition, performance penalties that result from constantly retrieving data from disk (as is done by methods in prior art) are eliminated. Finally, prior art does has dealt exclusively with Frequent Item sets, this invention introduces the novel definition and implementation of the ETF's, a substantially more powerful generalization of frequent item sets The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
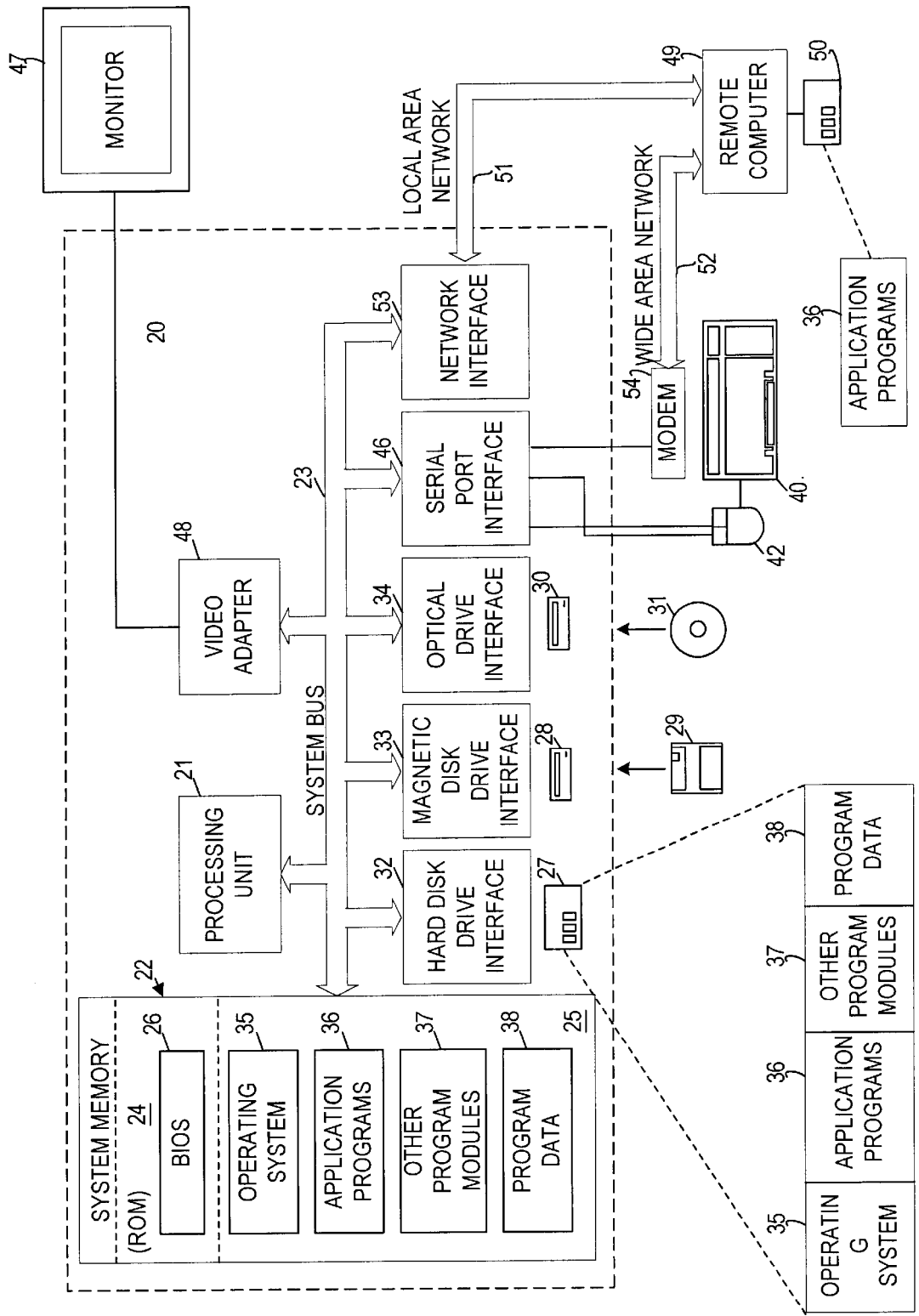
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM)

24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

(Transactional) Binary Data

In this section of the detailed description, transactional binary data is described, in conjunction with which embodiments of the invention may be practiced. It is noted, however, that the invention is not limited to application to transactional binary data. In other embodiments, categorical discrete data, and continuous data, are amenable to embodiments of the invention.

Figure 2:
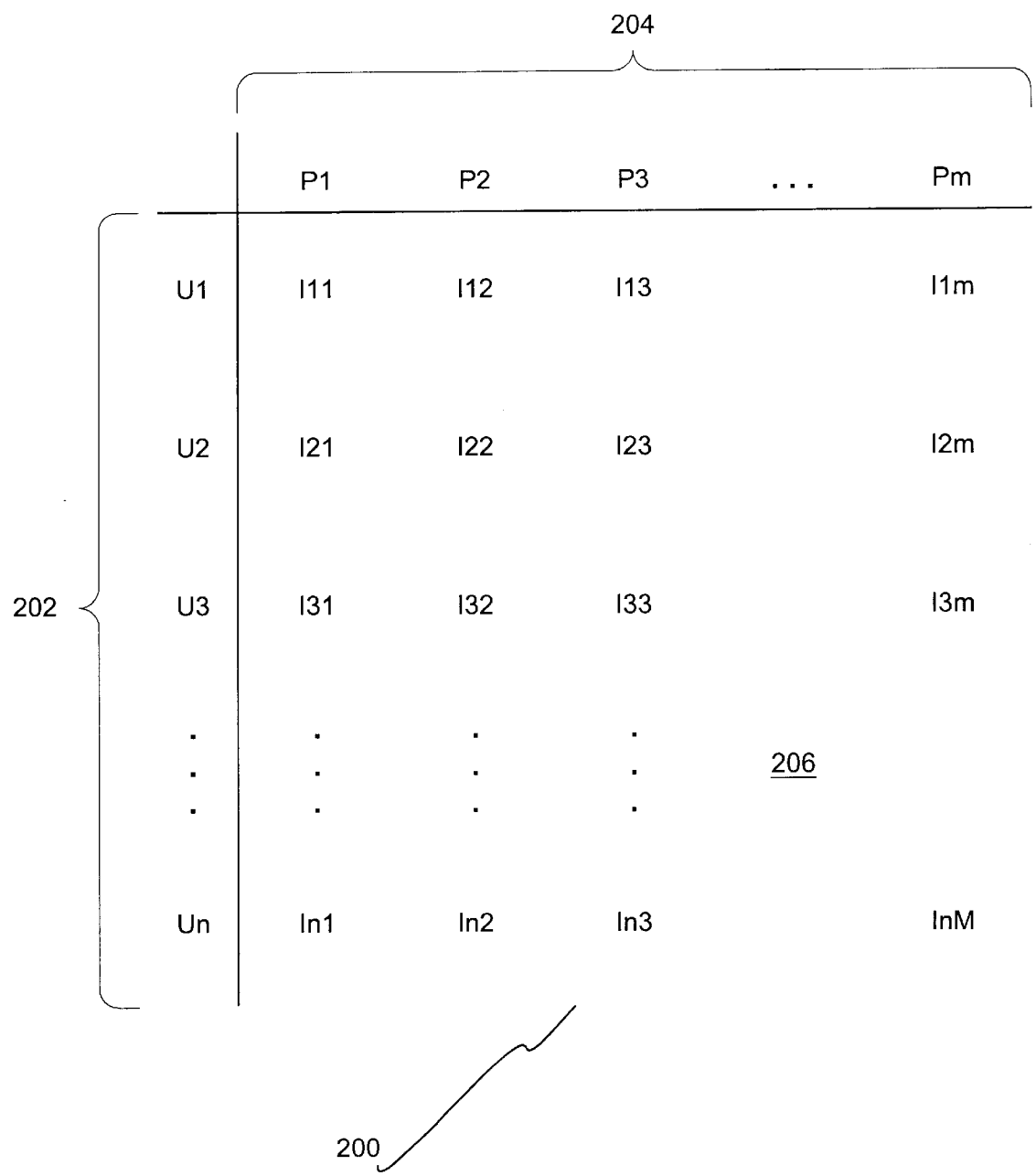
FIG. 2 is a diagram showing a representative set of binary transactional data in conjunction with which embodiments of the invention can be practiced; and, FIG. 3 is a flowchart of approaches to find clusters within data of a database, according to varying embodiments of the invention.

Referring to FIG. 2, a diagram of transactional binary data in conjunction with which embodiments of the invention may be practiced is shown. The data 206 is organized in a chart 200, with rows 202 and columns 204. Each row, also referred to as a record, in the example of diagram of FIG. 2 corresponds to a user, such as users 1 . . . n. In general, the term user, entity, row, or records is used to represent a collection of transactions pertaining to a single entity. These could be products bought by a shopper, in which case the record consists of the collection of all products purchased by a particular shopper. In general the semantics of a row in the binary data table need not be that of user. Each column is referred to as a dimension. In the example of FIG. 2, each column corresponds to a products, such as products 1 . . . m. But, in general the semantics of a column in the binary table need not be that of products. Each entry within the data 206, also referred to as each item within the data 206, corresponds to whether the user has purchased the particular product, and is a binary value, where 1 corresponds to the user having purchased the particular product, and 0 corresponds to the user not having purchased the particular product. Thus, I23 corresponds to whether user 2 has purchased product 3, In2 corresponds to whether user n has purchased item 2, I1m corresponds to whether user 1 has purchased item m, and InM corresponds to whether user n has purchased item M.

The data 206 is referred to as sparse, because most items have the value 0, indicating the fact that for any particular user, the user has likely not purchased a given product in this example. The data 206 is binary in that each item can have either the value 0 or the value 1. The data 206 is transactional in that the data was acquired by logging transactions of users' purchasing activity over a given period of time. It is noted that the particular correspondence of the rows 202 to users, and of the columns 204 to products, is for representative example purposes only, and does not represent a limitation on the invention itself. For example, the columns 204 in other embodiment could represent web pages that the users have viewed. In general, the rows 202 and the columns 204 can refer to any type of features. The columns 204 are interchangeably referred to herein as dimensions, while the rows 202 are interchangeably referred to herein as data points. Furthermore, it is noted that in large databases, the values n for the number of rows 202 can be quite large, approaching hundreds of thousands to tens of millions or more. And m for the number of columns 204 can be quite large, approaching the tens and the hundreds of thousands, if not more.

An error tolerant frequent itemset (ETF) over the data 206 is defined generally as a set of dimensions, referred to as the defining dimensions, where a predetermined value, such as 1 or 0, appears with high probability over a subset of the records (rows). Typically the "distinguished value" is '1'. More specifically, in one embodiment, an ETF is non-restrictively defined as a set of records R and a set of defining dimensions DD such that R contains at least a predetermined number of records, referred to as minSupport, such that, for each of these records, the fraction of values not equal to the predetermined value over the defining dimensions DD is not greater than a predetermined maximum error threshold, which is referred to as maxError. If the predetermined value is "1", then observing a "0" over the records R and the defining dimensions DD is considered an error and the proportion of errors must be less than maxError.

Determining the ETF's for the data 206 is also referred to as clustering of the data 206, or segmentation of the data 206 since members of an ETF are records which are similar to each other (have similar values over the set of defining dimensions DD). Where n and m are large, utilizing prior art clustering techniques can result in very long processing times, since the entire database of the data 206 cannot be stored in memory at one time. Thus, the techniques require constant disk access, for example, which lengthens processing time. Therefore, embodiments of the invention relate to determining ETF's using only samples of the data 206 at a given time, which can in some embodiments—although this is not required by the invention—be in memory at one time. Furthermore, an ETF is also referred to herein as an error-tolerant frequent item set, which are items within the data 206 that frequently occur together within a transaction.

Prior art definitions of a "cluster" typically include a summary of the data records belonging to the cluster (i.e. the "members" of the cluster) and a criterion used to assign data records to a cluster. In typical clustering algorithms, the membership is one cluster per record. Probabilistic approaches to clustering require a statistical model of the data associated with each cluster. The concept of error-tolerant frequent itemsets (ETF) is used herein to summarize the members of a cluster. Specifically, the ETF represents the following cluster summary: the records belonging to a cluster defined by an ETF having defining dimensions DD have (approximately) the same attribute values over the defining dimensions DD. The ETF says nothing about non-defining dimensions, in contrast to usual clustering methodologies where a cluster specifies a complete distribution on all dimensions. Even distance-based clustering methods, such as K-means, base the distance on all dimensions. ETF's are defined and described by their defining dimensions only. They also admit overlap between clusters. The criteria used to assign a data record to a cluster is based on observing the attribute values for the data record over DD and if these values are "similar" to the ETF, then the record is a member of the cluster defined by the ETF (specific embodiments of this membership criteria are given below).

Let I be the set of all items. An error-tolerant item set (frequent item set) is defined as follows: an itemset $E \subseteq I$ is an error-tolerant itemset having error $\epsilon$ and support $\kappa$ with respect to a database D having n transactions if there exists at least $\kappa \cdot n$ transactions in which the probability of observing a 1 (predefined or distinguished value which in binary data distinguish the occurrence of an event as opposed to the predominant "default" which in sparse binary data represent the non-occurrence of an event) over the itemset is not less than $1-\epsilon$. Note that even though the definition only references the defining dimensions (in contrast to clustering which usually refers to all dimensions), it can be viewed as defining a group of records that contain a "vertical" slice that satisfies the definition of the ETF. Note that ETF existence is not tied to a specific set of records (as is the case for frequent itemsets), but rather as long as enough records exist to satisfy the requirement. Hence the support set is not necessarily unique for ETF's. By defining a membership function to go along with a set of ETF's, clusters can be derived based on ETF's.

When attempting to cluster large binary-valued databases, prior art techniques are often plagued by finding many empty clusters (clusters having no members) and clusters which are the same (2 or more clusters have near-identical parameters, hence describe the same set of records) and are redundant. Embodiments of the invention can be used as an initial input to prior art clustering techniques, or can be used on their own to find clusters within data.

Finding Clusters using ETF's According to Varying Embodiments of the Invention

Figure 3:
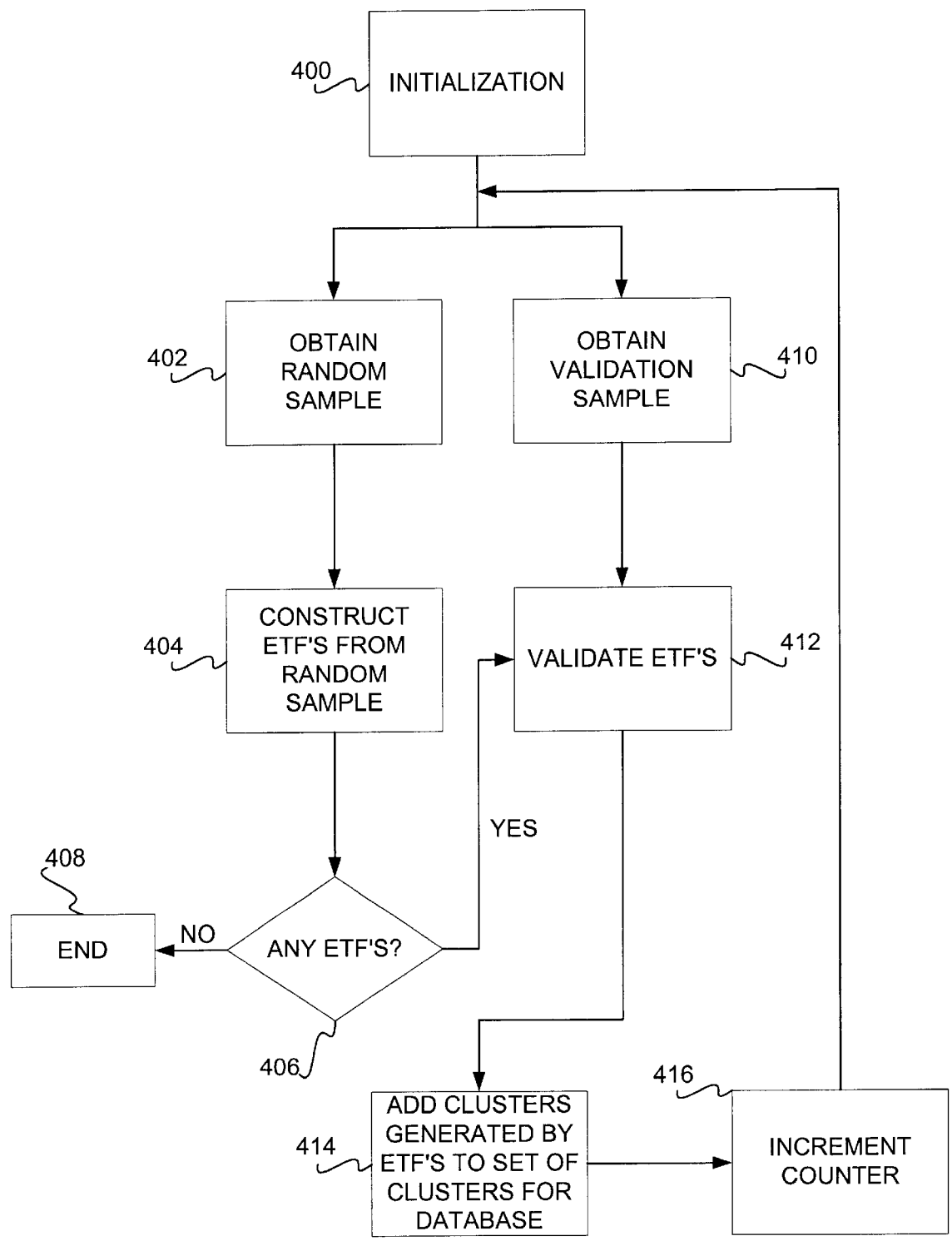

In this section of the detailed description, manners by which ETF's are found according to varying embodiments of the invention are described. That is, manners by which a set of frequent item sets within a database of data, organized into records and dimensions as has been described, are found are presented. The description is made in conjunction with the method of the flowchart of FIG. 3. The method of FIG. 3 is now described in detail. The description is specifically made with reference to ETF's; however, those of ordinary skill within the art can appreciate that the description is applicable to clusters.

In 400, initialization occurs. This includes setting an increment counter to one, and also includes setting the set of ETF's for the database to empty—that is, the empty set. This set of ETF's is then grown, as will be described. In 402, a uniform random sample from the database is obtained, that is, determined. The invention is not limited to the manner by which such a uniform random sample is obtained, and those of ordinary skill within the art can appreciate that manners by which to obtain uniform random samples from databases are known within the art. The random sample is uniform in that it reflects the underlying data distribution of the database as a whole (each data record is equally likely to appear in the sample). Furthermore, in one embodiment, the uniform sample fits into the memory of a computer which is implementing the method of FIG. 3, although the invention is not so limited.

In 404, ETF's are constructed, that is, determined, from the random sample obtained in 402. This is referred to herein as the sample set of ETF's. The invention is not limited to the manner by which the ETF's are constructed. In one embodiment, they are constructed as described in the cofiled and coassigned patent application Ser. No. 09/500,173 entitled "Data Clustering Using Error-Tolerant Clusters," although the invention itself is not so limited. It is noted that in embodiments of the invention where the random sample fits into memory, that ETF construction occurs relatively quickly, since disk access to the hard disk drive where the database itself may be stored is not usually necessary.

If no ETF's are found, that is, if the sample set of ETF's is empty (the empty set), then the method next proceeds from 406 to 408, where it is finished. Otherwise, the method proceeds from 408 to 412, where the sample set of ETF's is validated. The sample set of ETF's is validated in one embodiment by testing the sample set of ETF's against a validation random sample of the data within the database, which is obtained—that is, determined—in 410. In one embodiment, the validation random sample is mutually exclusive with the random sample itself—that is, they have no records in common. In other words, the intersection of the validation random sample and the random sample is the empty set. In one embodiment, the validation random sample is the complement to the random sample. It is noted that the validation random sample does not have to fit into memory, even if the random sample itself has been determined such that it does fit into memory.

In one embodiment, the sample set of ETF's is tested against the validation random sample by determining whether each ETF of the sample set also occurs in the validation random sample. Specifically, spurious ETF's that are found by chance within the random sample, but do not exist within the validation random sample are desired to be either adjusted, by removing spurious defining dimensions within the ETF until they are found within the validation random sample, or if no adjustment can be made, by removing the spurious ETF completely from the sample set of ETF's. Thus, validating the sample set of ETF's results in a validated sample set of ETF's that may have ETF's either adjusted and/or removed as compared to the pre-validated sample set of ETF's.

To identify spurious ETF's within the sample set of ETF's, the following is performed in one embodiment of the invention. First, the following nomenclature is used: RS refers to the random sample, |RS| refers to the number of records within the random sample, S refers to an ETF within the sample set of ETF's being tested, VS refers to the validation random sample, |VS| refers to the number of records within the validation random sample, and NS(RS) refers to the number of records from RS that belong to the ETF S. Furthermore, the proportion of points in the random sample belonging to S is referred to as a random variable p. The value of p over RS is therefore estimated as $$p = \frac{NS(RS)}{|RS|},$$

and the standard deviation is given by $$\sigma = \sqrt{\frac{p(1-p)}{|RS|}}.$$

A cluster is considered non-spurious and thus valid if the number of records belonging to it over the validation set, referred to as NS(VS), is no less than one standard deviation of the expected number in VS, or, $$\frac{NS(VS)}{|VS|} \geq \frac{NS(RS)}{|RS|} - \sigma.$$

Note that in general, a specified range of around the value NS(RS)/|RS| is given and if the ratio NS(VS)/|VS| falls within the specified range, it is considered valid. In the example above the range is (NS(RS)/|RS|−σ) and greater. ETF's that do not satisfy this criteria are adjusted, if possible, or removed.

In one embodiment, spurious ETF's are attempted to be adjusted to become non-spurious by identifying and removing spurious defining dimensions within such an ETF. That is, dimensions of an ETF that happen to occur by chance with the other defining dimensions over the random sample RS are desired to be removed. This situation is identified by considering the ETF with the first defining dimension removed, then counting the number of records from the validation set VS that satisfies the reduced cluster description. Determining whether or not the first defining dimension is spurious is done by comparing the probability of observed a predetermined value, such as 1, in the removed dimension over records satisfying the reduced ETF description, with the probability of observing this predetermined value over the entire validation set.

More formally, the following nomenclature is used. The removed defining dimension for ETF S is referred to as $D_1$, $p(D_1|\{S-D_1\})$ refers to the probability of observing the predetermined value in dimension $D_1$ over the data in the validation set VS belonging to the reduced ETF having defining dimensions in S excluding $D_1$, and $p(D_1)$ refers to the probability of observing the predetermined value in dimension $D_1$ over the entire validation set VS. Then, if $p(D_1|\{S-D_1\})$ is within one standard deviation from the value $p(D_1)$, then the dimension $D_1$ is considered a spurious defining dimension and removed from the description of S. The standard deviation of $p(D_1)$ is given by $$\sigma(D_1) = \sqrt{\frac{p(D_1)(1-p(D_1))}{|RS|}}.$$

Specifically, dimension $D_1$ is removed from the defining dimensions for cluster S if: $p(D_1)-\sigma(D_1) \leq p(D_1|\{S-D_1\}) \leq p(D_1)+\sigma(D_1)$.

Note that in general, a specified range of around the value $p(D_1)$ is given and if the value $p(D_1|\{S-D_1\})$ falls outside the specified range, it is considered valid. In the example above the range is $p(D_1)-\sigma(D_1)$ to $p(D_1)+\sigma(D_1)$.

All dimensions within an ETF determined to be spurious are thus so tested for spuriousness themselves, and removed if found to be spurious. This process is repeated until the ETF contains no spurious dimensions, or until no defining dimensions remain, in which case the ETF itself is removed from the sample set of ETF's.

Once the sample set of ETF's has been validated in 412, the method of FIG. 3 continues to 414. In 414, the sample set of ETF's—as validated—is added to the set of ETF's for the database itself. That is, the sample set of ETF's determined in 404, as the ETF's have been refined or pruned in 412, is added to the set of ETF's for the database itself in 414. Also in 414 duplicate ETFs that may have been validated are removed from the set of ETFs for the database itself. In 416, the counter is incremented by one, and the method repeats in 402. Specifically, the random sample obtained in each subsequent iteration of 402 is such that the random sample is mutually exclusive (in one embodiment) from prior uniform random samples taken in 402. That is, the intersection of the additional uniform random sample and all previous uniform random samples obtained is the empty set. Where $RS_i$ refers to the uniform random sample taken in iteration i of 402, this requirement can be stated as $$RS_i \cap RS_{i-1} \cap \ldots \cap RS_1 = \emptyset,$$

where ∅ is the null or empty set. In another embodiment, in addition to the random sample at each subsequent iteration being mutually exclusive from previous random samples, the data in the current database sufficiently summarized by the set of ETFs obtained in 414 are removed so that only new ETFs are discovered in 404 over the new random sample. Thus, the method of FIG. 3 repeats until no more new ETF's can be found—that is, the sample set of clusters determined in 404 is empty—in which case the method ultimately ends in 408.

It is noted that in some embodiments, the method of FIG. 3 is computer-implemented. The computer-implemented method can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Furthermore, it is noted that embodiments of the invention are not limited to any particular type of data on which the clustering approach thereof are used. In some embodiments, the clustering approach is useful for applications including data mining, data analysis in general, data visualization, sampling, indexing, prediction, and compression. Specific applications in data mining including marketing, fraud detection (in credit cards, banking, and telecommunications), customer retention and churn minimization (in all sorts of services including airlines, telecommunication services, internet services, and web information services in general), direct marketing on the web and live marketing in electronic commerce.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method for determining a set of error-tolerant frequent item sets within a database of data organized into records and dimensions comprising:
   determining a sample set of error-tolerant frequent item sets comprising a set of defining dimensions within a uniform random sample of the data within the database;
   validating the sample set of error-tolerant frequent item sets;
   determining the set of error-tolerant frequent item sets as including the sample set of error-tolerant frequent item sets as validated;
   repeating determining an additional sample set of error-tolerant frequent item sets within additional uniform samples mutually exclusive from prior uniform samples from which sample sets of error-tolerant frequent item sets were determined, validating the additional sample set, and determining the set of error-tolerant frequent item sets as including the additional sample set as validated, until the additional sample set is empty.

2. The method of claim 1, further comprising initially determining the uniform sample of the data within the database.

3. The method of claim 1, wherein the uniform sample fits into memory of a computer on which the method is being implemented.

4. The method of claim 1, wherein validating the sample set of error-tolerant frequent item sets comprises testing the sample set of error-tolerant frequent item sets against a validation random sample of the data within the database that is mutually exclusive with the random sample.

5. The method of claim 4, wherein testing the sample set of error-tolerant frequent item sets against a validation random sample comprises determining the validation random sample.

6. The method of claim 4, wherein testing the sample set of error-tolerant frequent item sets against a validation random sample comprises identifying spurious sets of items within the sample set of error-tolerant frequent item sets, and upon so identifying, removing the spurious sets of items from the sample set of error-tolerant frequent item sets.

7. The method of claim 4, wherein testing the sample set of error-tolerant frequent item sets against a validation random sample comprises identifying spurious defining dimensions within the error-tolerant frequent item sets of the sample set of error-tolerant frequent item sets, and upon so identifying, removing the spurious defining dimensions from the error-tolerant frequent item sets of the sample set of error-tolerant frequent item sets.

8. The method of claim 1, wherein the data of the database comprises at least one of transactional and binary data.

9. The method of claim 1, wherein the data comprises non-binary data, and the method initially comprises transforming the non-binary data into binary data.

10. The method of claim 9, wherein the data comprises categorical discrete data.

11. The method of claim 9, wherein the data comprises continuous data.

12. The method of claim 1, wherein an error-tolerant frequent item set comprises a cluster, such that the method is for clustering the database.

13. The method of claim 1, wherein an error-tolerant frequent item set comprises a cluster defined as a set of records such that the set of records includes at least a predetermined minimum threshold number of records, and for each of the set of records, the fraction of values not equal to a predetermined value over the defining dimensions is not greater than a predetermined maximum error threshold.

14. The method of claim 13, wherein the data of the database comprises binary data, and the predetermined value comprises one of zero and one.

15. A computer-implemented method for clustering a database of data organized into records and dimensions comprising:
   determining a first sample set of clusters within a uniform sample of the data within the database;
   validating the sample set of clusters by testing the first sample set of clusters against a validation random sample of the data within the database;
   determining a result set of clusters as including the first sample set of clusters as validated;
   repeating determining an additional sample set of clusters within an additional uniform sample that is mutually exclusive from prior uniform samples from which the result set of clusters were determined, validating the additional sample set, and determining the result set of clusters as including both the first and any additional sample sets as validated, until the additional sample set is empty.

16. The method of claim 15, further comprising initially determining the uniform sample of the data within the database.

17. The method of claim 15, wherein the uniform sample fits into memory of a computer on which the method is being implemented.

18. The method of claim 15, wherein the validation random sample of the data within the database that is mutually exclusive with the random sample.

19. The method of claim 18, wherein testing the sample set of clusters against a validation random sample comprises determining the validation random sample.

20. The method of claim 18, wherein testing the sample set of clusters against a validation random sample comprises identifying spurious clusters within the sample set of clusters, and upon so identifying, removing the spurious clusters from the sample set of clusters.

21. The method of claim 18, wherein testing the sample set of clusters against a validation random sample comprises identifying spurious defining dimensions within the clusters of the sample set of clusters, and upon so identifying, removing the spurious defining dimensions from the clusters of the sample set of clusters.

22. The method of claim 15, wherein a cluster is defined as a set of records and a set of defining dimensions within the data of the database such that the set of records includes at least a predetermined minimum threshold number of records, and for each of the set of records, the fraction of values not equal to a predetermined value (errors) over the defining dimensions is not greater than a predetermined maximum error threshold.

23. A machine-readable medium having instructions stored thereon for execution by a processor of a computer to perform a method for determining a set of error-tolerant frequent item sets within a database of data organized into records and dimensions comprising:

determining a uniform sample of the data within the database that fits into memory of the computer;

determining a sample set of error-tolerant frequent item sets comprising a set of defining dimensions within the uniform sample;

validating the sample set of error-tolerant frequent item sets by testing the sample set of error-tolerant frequent item sets against a validation random sample of the data within the database that is mutually exclusive with the random sample;

determining the set of error-tolerant frequent item sets as including the sample set of error tolerant frequent item sets as validated; and, repeating determining an additional uniform sample that is mutually exclusive from prior uniform samples from which sample sets of error-tolerant frequent item sets were determined, determining an additional sample set of error-tolerant frequent item sets within the additional uniform sample, validating the additional sample set, and determining the set of error-tolerant frequent item sets as including the additional sample set as validated, until the additional sample set is empty.

24. The medium of claim 23, wherein testing the sample set of error-tolerant frequent item sets against a validation random sample comprises determining the validation random sample.

25. The medium of claim 23, wherein testing the sample set of error-tolerant frequent item sets against a validation random sample comprises identifying spurious error-tolerant frequent item sets within the sample set of error-tolerant frequent item sets, and upon so identifying, removing the spurious error-tolerant frequent item sets from the sample set of error-tolerant frequent item sets.

26. The medium of claim 23, wherein testing the sample set of error-tolerant frequent item sets against a validation random sample comprises identifying spurious defining dimensions within the error-tolerant frequent item sets of the sample set of error-tolerant frequent item sets, and upon so identifying, removing the spurious defining dimensions from the error-tolerant frequent item sets of the sample set of error-tolerant frequent item sets.

27. A machine-readable medium having instructions stored thereon for execution by a processor of a computer to perform a method for clustering a database of data organized into records and dimensions comprising:

determining a uniform sample of the data within the database that fits into memory of the computer;

determining a first sample set of clusters within the uniform sample;

validating the sample set of clusters by testing the sample set of clusters against a validation random sample of the data within the database that is mutually exclusive with the random sample;

determining a result set of clusters as including the sample set of clusters as validated;

repeating determining an additional uniform sample that is mutually exclusive from prior uniform samples from which the result set of clusters were determined, determining an additional sample set of clusters within the additional uniform sample, validating the additional sample set, and determining the result set of clusters as including both the first and any additional sample sets as validated, until the additional sample set is empty.

28. The medium of claim 27, wherein testing the sample set of clusters against a validation random sample comprises determining the validation random sample.

29. The medium of claim 27, wherein testing the sample set of clusters against a validation random sample comprises identifying spurious clusters within the sample set of clusters, and upon so identifying, removing the spurious clusters from the sample set of clusters.

30. The medium of claim 27, wherein testing the sample set of clusters against a validation random sample comprises identifying spurious defining dimensions within the clusters of the sample set of clusters, and upon so identifying, removing the spurious defining dimensions from the clusters of the sample set of clusters.

31. The medium of claim 27, wherein a cluster is defined as a set of records and a set of defining dimensions within the data of the database such that the set of records includes at least a predetermined minimum threshold number of records, and for each of the set of records, the fraction of a predetermined value over the defining dimensions is not greater than a predetermined maximum error threshold.

* * * * *